(12) United States Patent
Taylor et al.

(10) Patent No.: US 10,496,853 B2
(45) Date of Patent: Dec. 3, 2019

(54) SECURING A HOST MACHINE AGAINST DIRECT MEMORY ACCESS (DMA) ATTACKS VIA EXPANSION CARD SLOTS

(71) Applicant: Phoenix Technologies Ltd., Campbell, CA (US)

(72) Inventors: Kenneth C. Taylor, Kirkland, WA (US); James L. Mortensen, Lynnwood, WA (US)

(73) Assignee: Phoenix Technologies Ltd., Pasadena, CA (US)

( * ) Notice: Subject to any disclaimer, the term of this patent is extended or adjusted under 35 U.S.C. 154(b) by 167 days.

(21) Appl. No.: 15/639,276

(22) Filed: Jun. 30, 2017

(65) Prior Publication Data

US 2019/0005273 A1    Jan. 3, 2019

(51) Int. Cl.
*G06F 21/85* (2013.01)
*G06F 13/28* (2006.01)
*G06F 13/40* (2006.01)
*G06F 13/42* (2006.01)
*G06F 21/56* (2013.01)
(Continued)

(52) U.S. Cl.
CPC ............. *G06F 21/85* (2013.01); *G06F 13/28* (2013.01); *G06F 13/4068* (2013.01); *G06F 13/4282* (2013.01); *G06F 21/567* (2013.01); *G06F 21/575* (2013.01); *G06F 21/6218* (2013.01); *G06F 2213/0024* (2013.01); *G06F 2213/0026* (2013.01); *G06F 2221/2149* (2013.01)

(58) Field of Classification Search
None
See application file for complete search history.

(56) References Cited

U.S. PATENT DOCUMENTS 6,665,759 B2 * 12/2003 Dawkins ................. G06F 13/28
710/200
7,334,123 B2 * 2/2008 Gulick .................... G06F 21/74
713/160

(Continued)

OTHER PUBLICATIONS

'PCI Hot Plug User's Guide 2.5' by Fujitsu, Apr. 2005. (Year: 2005).*

(Continued)

*Primary Examiner* — Steven G Snyder
(74) *Attorney, Agent, or Firm* — Brokaw Patent Law PC; Christopher J. Brokaw (57) ABSTRACT

Approaches for securing a host machine against security attacks conducted using Direct Memory Access (DMA). Platform firmware does not enable bus mastering during PCI bus enumeration. When the platform firmware determines that an expansion card has been plugged into an expansion card slot of the host machine, the platform firmware determines whether the expansion card slot has been approved by a user of the host machine for permitting Direct Memory Access (DMA) with the host machine. Unless the expansion card slot has been determined to be approved by the user for permitting Direct Memory Access (DMA) with the host machine, the platform firmware does not allow drivers that might enable DMA to connect to the device and does not grant permission to the expansion card slot and any upstream bridges to conduct Direct Memory Access (DMA) with the host machine.

23 Claims, 3 Drawing Sheets

(51) Int. Cl.
    *G06F 21/62*     (2013.01)
    *G06F 21/57*     (2013.01)

(56) References Cited

U.S. PATENT DOCUMENTS

| | | | | |
|---|---|---|---|---|
| 7,389,427 | B1* | 6/2008 | McKeen | G06F 12/1433 |
| | | | | 711/163 |
| 7,689,733 | B2* | 3/2010 | Carpenter | G06F 12/145 |
| | | | | 709/212 |
| 9,032,181 | B2* | 5/2015 | Ahmad | G06F 12/1018 |
| | | | | 711/203 |
| 10,055,357 | B2* | 8/2018 | Vidyadhara | G06F 12/1081 |
| 10,146,962 | B2* | 12/2018 | Sarangdhar | G06F 9/4401 |
| 2002/0124127 | A1* | 9/2002 | Dawkins | G06F 13/28 |
| | | | | 710/200 |
| 2004/0250063 | A1* | 12/2004 | Gulick | G06F 21/74 |
| | | | | 713/160 |
| 2005/0182862 | A1* | 8/2005 | Ritz | G06F 13/28 |
| | | | | 710/22 |
| 2008/0222663 | A1* | 9/2008 | Carpenter | G06F 12/145 |
| | | | | 719/328 |
| 2010/0299667 | A1* | 11/2010 | Ahmad | G06F 12/1018 |
| | | | | 718/1 |
| 2017/0024570 | A1* | 1/2017 | Pappachan | G06F 13/28 |
| 2017/0026181 | A1* | 1/2017 | Chhabra | G06F 9/45558 |
| 2017/0090800 | A1* | 3/2017 | Alexandrovich | G06F 3/0622 |
| 2017/0177909 | A1* | 6/2017 | Sarangdhar | G06F 9/4401 |
| 2017/0185766 | A1* | 6/2017 | Narendra Trivedi | G06F 21/53 |
| 2017/0255567 | A1* | 9/2017 | Vidyadhara | G06F 12/1081 |
| 2017/0277530 | A1* | 9/2017 | Adams | G06F 8/65 |
| 2018/0276394 | A1* | 9/2018 | Nair | G06F 21/602 |

OTHER PUBLICATIONS

'PCI Express Base Specification Revision 3.0' Nov. 10, 2010. (Year: 2010).*
'Supporting PCI Hot Plug Technology in the Novell Architecture' by Novell, Mar. 1, 1998. (Year: 1998).*
'Bus Master Performance Demonstration Reference Design for the Xilinx Endpoint PCI Express Solutions' by Jason Lawley, Apr. 3, 2015. (Year: 2015).*
'A Tour beyond BIOS Using Intel VT-d for DMA Protection in UEFI Bios' by Jiewen Yao and Vincent J. Zimmer, White Paper, Intel, Jan. 2015. (Year: 2015).*
Unified Extensible Firmware Interface (UEFI) Specification, Version 2.8, Mar. 2019, pp. i-iv, 680-684. (Year: 2019).*
Unified Extensible Firmware Interface (UEFI) Specification version 2.7, May 2017, p. 821.

* cited by examiner

SECURING A HOST MACHINE AGAINST DIRECT MEMORY ACCESS (DMA) ATTACKS VIA EXPANSION CARD SLOTS

FIELD OF THE INVENTION

Embodiments of the invention generally relate to approaches for securing one or more expansion card slots of a host machine from direct memory access (DMA) attacks.

BACKGROUND

In 2017, a security vulnerability present in certain computer systems was discovered. A demonstration of this security vulnerability involved launching an attack on a computer system using Direct Memory Access (DMA) over an external expansion card slot of a host machine to bypass a login screen on the Linux operating system executing on the host machine. Direct Memory Access (DMA) is an approach that allows an input/output device to send or receive data to or from the main memory of the host machine in a manner that bypasses the CPU of the host machine to speed up memory operations.

As a result of the discovered security vulnerability to the Linux operating system, the industry has collectively concluded that an operating system must protect itself using virtualization technology to block DMA-based attacks from malicious devices.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for securing a host machine comprising platform firmware are presented herein. In the following description, for the purposes of explanation, numerous specific details are set forth in order to provide a thorough understanding of the embodiments of the invention described herein. A specific type of widely used platform firmware, as described by the Unified Extensible Firmware Interface (UEFI) specification, will be used as a description vehicle. It will be apparent, however, that the embodiments of the invention described herein may be practiced without these specific details and using other platform firmware types. In other instances, well-known structures and devices are shown in block diagram form or discussed at a high level in order to avoid unnecessarily obscuring teachings of embodiments of the invention.

Functional Overview

A security vulnerability in the Linux operating system involving Direct Memory Access (DMA) was discovered in 2017; however, it is observed by the Applicant that using a similar attack vector, not only may the Linux operating system be compromised by such an attack, but an attacker may use a special purpose device, capable of Direct Memory Access (DMA), to connect to a host machine and inject malware into a computer platform boot path implemented in platform firmware.

As recognized by the Applicant, if an attacker were to gain access to the boot path early enough in the boot process, then the attacker may use DMA to modify various firmware components, normally secure SMRAM contents such as SMI handlers and the S3 boot script, and Flash contents such as firmware volumes and stored system control variables. If an attacker were to gain access to the boot path later in the boot process but prior to the loading of an operating system, DMA may be used to modify boot path code for purposes of bypassing certain security features, such as Secure Boot as described in the UEFI specification.

To address the security vulnerability in the Linux operating system, the industry is moving towards using virtualization technology to block DMA-based attacks from rogue devices. However, the Applicant recognizes that virtualization is not suitable for deployment by platform firmware due in part to the resources required to implement a virtualized environment. Further, implementing virtualization technology in platform firmware is a complex task fraught with high risk. Even if all firmware and UEFI-specific technical issues could be resolved, there will likely be compatibility issues for certain operating systems and add-on expansion cards.

Advantageously, embodiments of the invention are directed towards preventing the injection of malware into a boot path of a host machine via Direct Memory Access (DMA). The boot path may be a UEFI boot path or may be another platform firmware implementation design boot path. Embodiments do not rely upon virtualization to protect the system boot path from malware injection; instead, embodiments protect the boot path of a host machine against malicious DMA attacks by selectively authorizing specific expansion card slots to permit DMA access.

In accordance with one embodiment of the invention, UEFI platform firmware secures a host machine against security attacks conducted using DMA by the UEFI platform firmware forbearing enablement of bus mastering during Peripheral Component Interconnect (PCI) bus enumeration. When the UEFI platform firmware determines that a device has been plugged into an expansion card slot of the host machine, then the UEFI platform firmware determining whether the expansion card slot has been approved by a user for conducting DMA with the host machine. Unless the expansion card slot has been approved by the user for conducting DMA with the host machine, the UEFI platform firmware withholds a grant of permissions to the expansion card slot to conduct DMA with the host machine, thereby preventing any expansion card plugged into that expansion card slot from being capable of injecting malware via DMA into the host machine. Further, the UEFI platform firmware ascertains whether an expansion card inserted into an expansion card slot appears to be an integrated device, and if so, may deny any permission to the expansion card slot to allow DMA and prevent the expansion card from communicating with the host machine using DMA. Embodiments may use a variety of different approaches for determining whether an expansion card should be treated as an integrated device.

Additional embodiments of the invention will be discussed in additional detail below.

Securing UEFI Platform Firmware

Figure 1:
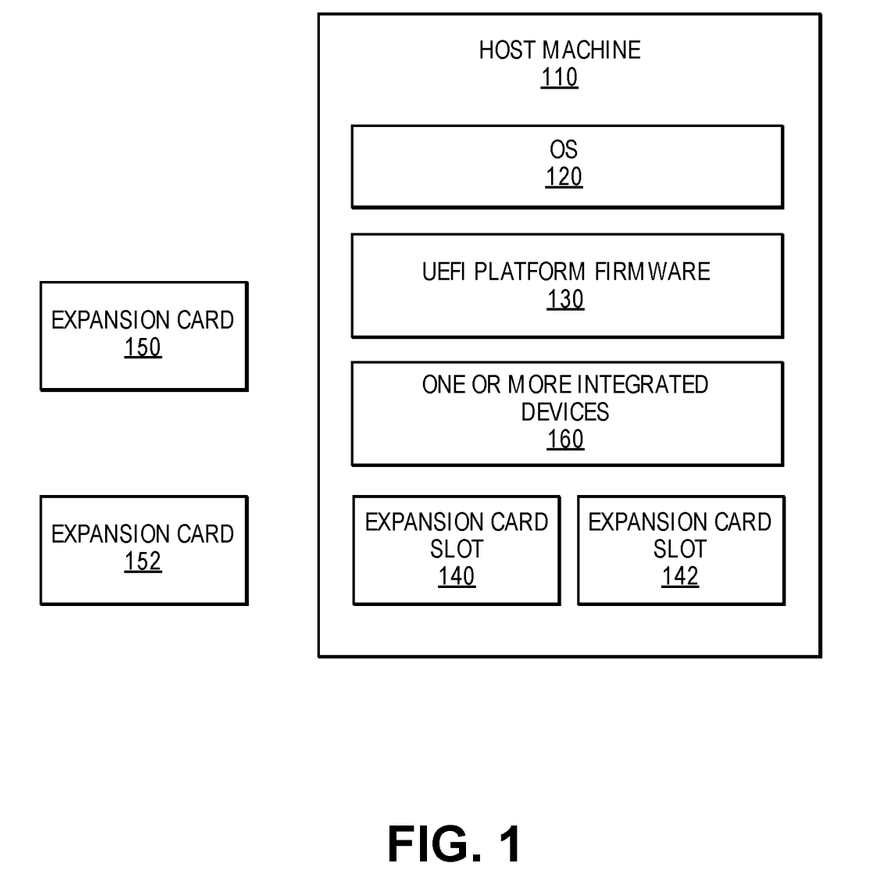
FIG. 1 is a block diagram of a system according to an embodiment of the invention.

FIG. 1 is a block diagram of a system according to an embodiment of the invention. FIG. 1 depicts a host machine

110. Host machine 110, as broadly used herein, represents any type of machine which can comprise UEFI platform firmware 130 and at least one expansion card slot. Non-limiting, illustrative examples of host machine 110 include a Personal Computer (PC), a laptop computer, a multi-function peripheral (MFP), a printer, and the like.

Host machine 110 may, but need not, comprise an operating system 120. While host machine 110 is depicted as having one operating system 120, host machine 110 may comprise two or more operating systems. As host machine 110 is intended to represent a wide variety of computing devices, while embodiments of the invention do not rely upon virtualization techniques to secure host machine 110, host machine 110 itself may, but need not, comprise a virtualized environment, such as, for example, one or more virtual machines, one or more containers, and one or more sandboxes.

UEFI platform firmware 130 represents firmware that corresponds to any version of the Unified Extensible Firmware Interface (UEFI) specification. The Unified EFI Forum is the industry body that manages the UEFI specification. Additional embodiments of the invention could be used to protect non-UEFI platform firmware implementations.

Host machine 110 comprises one or more expansion card slots, such as expansion card slots 140 and 142. While two expansion card slots are depicted in the exemplary embodiment of FIG. 1, other embodiments may comprise any number of expansion card slots, as the number of expansion card slots on host machine 110 can vary given the needs and design considerations of host machine 110. As broadly used herein, an expansion card slot is intended to represent anything into which an expansion card may be inserted into to establish an operational connection between an expansion card and host machine 110. As an example, an expansion card slot may be a connection or port located inside a computer on the motherboard or riser board that allows an expansion card to be connected. An expansion card slot may also be referred to in the art as a bus slot, expansion port, or PCI slot.

FIG. 1 also depicts expansion cards 150 and 152. While two separate expansion cards are depicted in FIG. 1, embodiments may be used with any number of expansion cards. An expansion card, as broadly used herein, represents a printed circuit board that can be inserted into an electrical connector, or expansion slot on a computer motherboard, backplane or riser card to add functionality to host machine 110 via the expansion bus. An expansion card may also be referred to in the art as an expansion board, adapter card, accessory card, or a PCI device. An expansion card, as used herein, may correspond to a PCI device, which is any piece of computer hardware that plugs directly into a PCI slot on a motherboard host machine 110. An expansion card may also include any device capable of connecting to a connector of an external port that provides access to the PCI bus, or the like, that enables the device direct access to memory in the host machine 110.

FIG. 1 also depicts host machine 110 as including one or more integrated devices 160. One or more integrated devices 160 are each a permanent part of host machine 110 so that each of one or more integrated devices is housed within the exterior of host machine 110. The term 'integrated devices,' as used herein, refers to devices which are an integral part of the physical hardware of the system. For example, a device is integrated into host machine 110 if it is soldered onto the motherboard, integrated into the silicon, or otherwise permanently attached to host machine 110. Non-limiting, illustrative examples of integrated devices include onboard USB controllers, onboard graphics devices, and onboard hard drive controllers.

Figure 2:
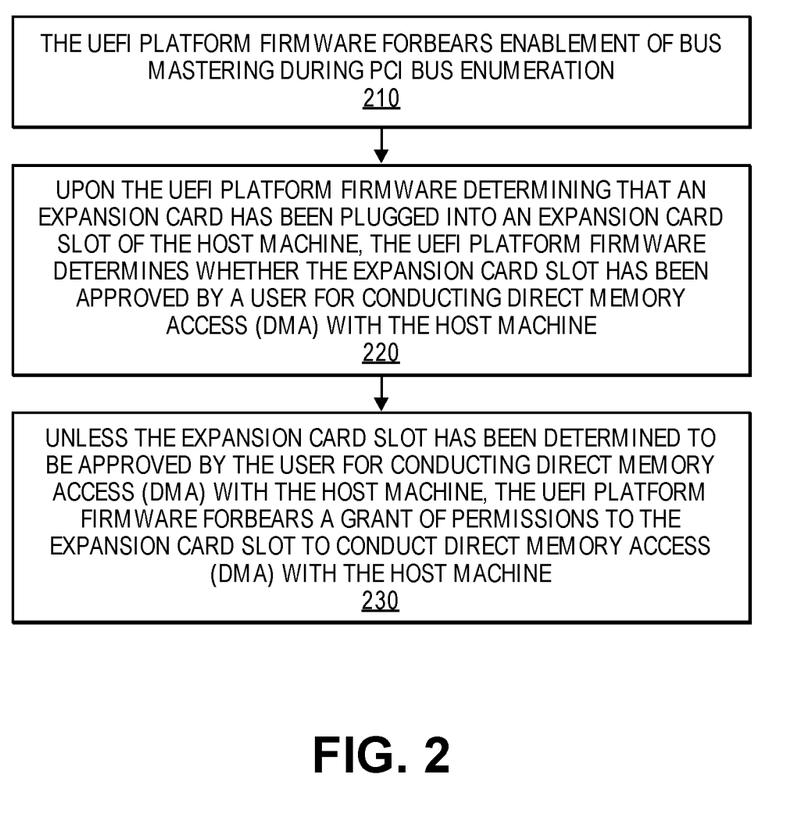
FIG. 2 is a flowchart of steps involved in securing a host machine comprising UEFI platform firmware according to an embodiment of the invention.

FIG. 2 is a flowchart of steps involved in securing a host machine comprising UEFI platform firmware according to an embodiment of the invention. The steps of FIG. 2 shall reference components depicted in FIG. 1 where appropriate. Note that the steps of FIG. 2 are representative of one embodiment; however, other embodiments may perform steps in a different order or in parallel to the order depicted in FIG. 2. Other embodiments may also perform additional steps than those depicted in FIG. 2, while other embodiments may not perform every step depicted in FIG. 2.

In step 210, UEFI platform firmware 130 forbears enablement of bus mastering during PCI bus enumeration. DMA access can be enabled by configuring a Bus Master Enable (BME) bit on both the PCI bridges and expansion cards attached to those PCI bridges. If the BME bit is set to a disabled state on a PCI bridge, then any attempts to perform DMA from an expansion card are blocked at the PCI bridge. If the BME bit on a particular expansion card is set to a disabled state, then that expansion card should not attempt to perform DMA, as this is the expected behavior according to the PCI specification. However, it is possible for a malicious attacker to design an expansion card that ignores its own BME control bit to perform DMA transactions as soon as bus mastering on the upstream bridge has been enabled. Therefore, to block DMA from any expansion cards connected to expansion card slots, an embodiment may ensure that bus mastering on upstream PCI bridges is not enabled. UEFI platform firmware 110 may forbear enablement of bus mastering on an upstream bridge of any expansion card slot of host machine 110.

Note that UEFI 2.6 specification section 13.3.2.1 explicitly states that bus mastering should be enabled for all PCI to PCI bridges. As this is expected behavior, bus mastering is required for some hardware to function during Power-On Self-Test (POST), which is a process that would be performed by UEFI platform firmware 130 immediately after host machine 110 is powered on. For example, integrated devices such as USB controllers, network controller, and hard drive controllers generally require bus mastering to function during POST. Embodiments may trust and grant permission to conduct DMA to integrated devices by default. In addition, a user of host machine 110 may desire to install additional expansion cards in host machine, and those added expansion cards may require bus mastering during POST to function properly.

To address this issue, in embodiments of the invention, UEFI platform firmware 130 providing controls, to a user of host machine 110, to enable bus mastering for one or more specific expansion card slots of host machine 110. Such controls may be embodied by an API or graphical user interface rendered on a display of host machine 110. Such a control would allow the user to configure whether a particular expansion card slot on host machine is enabled for or otherwise supports DMA. When UEFI platform firmware 130 receives a request or instruction, from the user, to enable DMA for a specific expansion card slot, UEFI platform firmware 110 may store, in a UEFI variable, authorizing data that evidences that the particular expansion card slot has been approved by the user for conducting DMA with host machine 110. Embodiments may store such authorizing data in a variety of different locations other than a UEFI variable, e.g., embodiments may store authorizing data that evidences that the particular expansion card slot has been approved by the user for conducting DMA with host machine 110 in any non-volatile storage medium.

One example of a UEFI variable which may be used by UEFI platform firmware 130 to document consent of a user for a particular expansion card slot to conduct DMA operations is the Boot#### UEFI variable. According to the UEFI Specification version 2.6, the Boot#### UEFI variables are RunTime accessible, thereby allowing operating system 120 to modify the boot actions as needed. However, operating system 120 has no need of modifying a Boot#### UEFI variable used in this fashion; accordingly, to protect a Boot#### UEFI variable used by an embodiment from unauthorized modifications while execution of operating system 120, prior to execution of operating system 120, UEFI platform firmware 130 ensures that the Boot#### UEFI variables are write-protected. While this behavior does not conform to UEFI 2.6 specification for Boot#### variables, it will not result in any operational issues and is necessary to prevent unauthorized modification of the Boot#### variables for ensuring unauthorized DMA access does not occur between expansion cards and host machine 110.

The user which configures whether a particular expansion card slot on host machine 110 is enabled for or otherwise supports DMA may be, in some cases, an end user or owner of host machine 110. For example, if an owner of host machine 110 wishes to augment host machine 110 by inserting expansion card 152 into expansion card slot 140 on host machine 110, then the user may use controls provided by UEFI platform firmware 130 to enable expansion card slot 140 to support DMA.

In other cases, a manufacturer of host machine 110 may wish to configure expansion card slots of host machine during assembly or manufacture of host machine 110 using the controls provided by UEFI platform firmware 130. In some cases, the manufacturer of host machine 130 may wish to prevent the end user from enabling at least one specific expansion card slot of host machine 110. To do so, the manufacturer may use the controls provided by UEFI platform firmware 130 to configure the operation of UEFI platform firmware 130 so that certain expansion card slots are not available to be enabled for DMA by the end user. For security reasons, a manufacturer of host machine 110 may wish to allow an end user of host machine 110 to enable DMA on expansion card slot 140 but not wish to allow the end user to enable DMA on expansion card slot 142. The manufacturer may use the controls provided by UEFI platform firmware 130 to prevent the end user from enabling DMA on expansion card slot 142. In this example, by default, DMA will be disabled on expansion card slot 140, and so at a later point in time if the end user wishes to access the controls provided by UEFI platform firmware 130 to enable expansion card slots on host machine 110 for DMA, the end user will be able to enable expansion card slot 140 but will not be able to enable expansion card slot 142.

To assist a manufacturer, UEFI platform firmware 130 may provide support for a blacklist of expansion card slots for which bus mastering should not be enabled by default. For each user-accessible expansion card slot on host machine 110, an entry that specifies its specific bridge is included within the blacklist. Such an entry may include a variety of information such as information identifying the UEFI device path to the bridge associated with the expansion card slot and a string variable to display to the end user in Setup (which may have a value of 'Null' to prevent display in Setup).

To assist a manufacturer, UEFI platform firmware 130 may provide support for a whitelist of integrated devices for which bus mastering should be enabled by default. For each integrated device on host machine 110, an entry that specifies its specific device path is included within the whitelist. Devices that are not included in the whitelist would be denied a grant of permissions to conduct DMA with host machine 110.

In an embodiment, when a user uses the controls provided by UEFI platform firmware 130 to authorize DMA access to be conducted by a particular expansion card slot, that expansion card slot is enabled as needed and all upstream bridges are enabled as needed.

In step 220, UEFI platform firmware 130 determines that an expansion card has been plugged into a particular expansion card slot on host machine 110. In response, UEFI platform firmware 130 determines whether expansion card slot into which the expansion card was inserted has been approved by the user for conducting DMA with host machine 110.

For purposes of providing a concrete example, assume expansion card 150 was plugged into expansion card slot 140. In this example, during step 220, UEFI platform firmware 130 determines that an expansion card has been plugged into expansion card slot 140 on host machine 110. In response, UEFI platform firmware 130 would determine whether expansion card slot 140 has been approved by the user for conducting Direct Memory Access (DMA) with host machine 110.

To do so, UEFI platform firmware 130 may, in a Connect process which connects a driver that supports a device type to a particular software device instance, access a UEFI variable to determine whether expansion card slot 140 has been approved by the user for conducting DMA with host machine 110.

A driver that supports a device type exposes an interface callable as part of the Connect process to initialize and enable a particular type of device, which can result in enabling DMA for the device.

In step 230, unless UEFI platform firmware 130 determines that expansion card slot 140 has been approved by the user for conducting DMA with host machine 110, then UEFI platform firmware 130 forbears calling the driver's interface which forbears any grant of permissions to expansion card slot 140 to conduct DMA with host machine 110.

UEFI platform firmware 130 may determining that an expansion card plugging into a particular expansion card slot is masquerading as an integrated device type for conducting DMA with host machine 110 supported by a driver. In this case, UEFI platform firmware 130 denies a grant of permissions to the rogue device to conduct DMA with host machine 110. UEFI platform firmware 130 may use a variety of techniques to determine whether an expansion card plugging into a particular expansion card slot is masquerading as an integrated device which has implicit approval for conducting DMA with host machine 110.

In certain embodiments, UEFI platform firmware 130 may comprise a PCI enumeration driver that is configured to indicate that DMA is supported for all devices and all bridges of the host machine without UEFI platform firmware 130 testing for such support. The rationale behind this behavior is that testing would require setting the BME bit that enables DMA, which would create a window of opportunity for a malicious expansion card to inject malware into host machine 110 via DMA or otherwise perform malicious DMA operations.

Advantageously, embodiments of the invention may be used to secure a host machine that comprises UEFI platform firmware. If the UEFI platform firmware does not enable DMA for a particular expansion card slot, then any expansion card that is plugged into that expansion card slot and which carries malware or malicious executable code will not be able to issue any DMA-based attacks against the host machine. Also, if the UEFI platform firmware only enables DMA when connecting a particular boot device in a particular expansion card slot on the host machine during a BDS phase, even if that boot device were to inject malicious code into the boot list, at this point during POST both SMRAM and Flash are locked and protected from modification by DMA access. Additionally, if the UEFI specification feature termed SecureBoot is enabled, then an expansion card with a malicious option ROM that enables DMA on its own will not be connected because the expansion card will not have a valid signed driver on the option ROM.

Example Implementations

Figure 3:
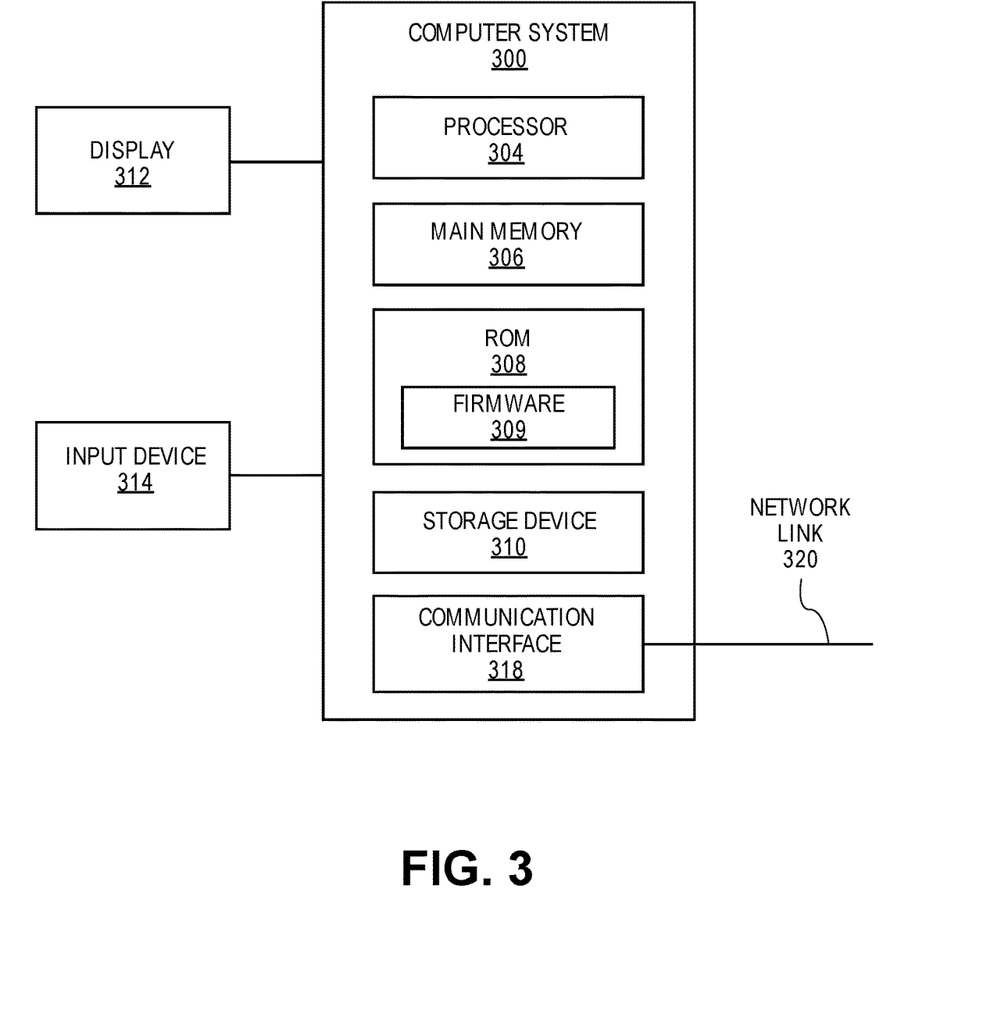
FIG. 3 is a block diagram that illustrates the hardware components of a computer system upon which an embodiment of the invention may be implemented.

Host machine 110 shown in FIG. 1 may be embodied by a computer system. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304.

Computer system 300 further includes a read only memory (ROM) 308 or other static storage device for storing static information and instructions for processor 304. ROM 308 may store firmware 309 in an embodiment. Firmware 309 of FIG. 3 may correspond to firmware 210 of FIG. 2 in an embodiment. A storage device 310, such as a magnetic disk, optical disk, or flash drive, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for securing a host machine comprising platform firmware, which when executed, cause:
the platform firmware securing the host machine against security attacks conducted using Direct Memory Access (DMA) by:
the platform firmware forbearing enablement of bus mastering during Peripheral Component Interconnect (PCI) bus enumeration,
upon the platform firmware determining that an expansion card has been plugged into an expansion card slot of the host machine, the platform firmware determining whether the expansion card slot has been approved by a user of the host machine for permitting Direct Memory Access (DMA) with the host machine, and
unless the expansion card slot has been determined to be approved by the user for permitting Direct Memory Access (DMA) with the host machine, forbearing a grant of permissions to the expansion card slot to conduct Direct Memory Access (DMA) with said host machine.

2. The one or more non-transitory computer-readable storage mediums of claim 1, wherein execution of the one or more sequences of instructions further cause:
the Unified Extensible Firmware Interface (UEFI) platform firmware providing controls, to the user of said host machine, to enable bus mastering for one or more expansion card slots of said host machine.

3. The one or more non-transitory computer-readable storage mediums of claim 2, wherein execution of the one or more sequences of instructions further cause:
upon the platform firmware receiving, from the user of said host machine via said controls, input authorizing bus mastering for a specific expansion card slot, storing authorizing data, evidencing that the specific expansion card slot has been approved by the user for conducting Direct Memory Access (DMA) with the host machine, in a persistent variable or in non-volatile storage.

4. The one or more non-transitory computer-readable storage mediums of claim 2, wherein execution of the one or more sequences of instructions further cause:
the platform firmware preventing the user from enabling at least one specific expansion card slot of said host machine using said controls.

5. The one or more non-transitory computer-readable storage mediums of claim 1, wherein the platform firmware determining that the device has been plugged into an expansion card slot of the host machine further comprises:
upon determining that the device is masquerading as an integrated device which has implicit approval for conducting Direct Memory Access (DMA) with the host machine, the platform firmware forbearing a grant of permissions to the rogue device to conduct Direct Memory Access (DMA) with said host machine.

6. The one or more non-transitory computer-readable storage mediums of claim 1, wherein the platform firmware forbearing enablement of bus mastering comprises:
the platform firmware comprising a PCI enumeration driver configured to indicate that DMA is supported for all devices and all bridges of the host machine without the platform firmware testing for such support.

7. The one or more non-transitory computer-readable storage mediums of claim 1, wherein the platform firmware determining whether the device has been approved by the user for conducting Direct Memory Access (DMA) with the host machine comprises:
the platform firmware, in a Connect process which connects a driver that supports a device type to a particular software device instance, accessing a persistent variable or non-volatile storage to determine whether the device has been approved by the user for conducting Direct Memory Access (DMA) with the host machine.

8. The one or more non-transitory computer-readable storage mediums of claim 1, wherein the platform firmware forbearing enablement of bus mastering comprises:
the platform firmware forbearing enablement of bus mastering on an upstream bridge of said expansion card slot of the host machine.

9. The one or more non-transitory computer-readable storage mediums of claim 1, wherein forbearing the grant of permissions to the expansion card slot to conduct Direct Memory Access (DMA) with the host machine comprises:
unless the platform firmware determines that the expansion card slot has been approved by the user for conducting Direct Memory Access (DMA) with the host machine, the platform firmware forbears calling an interface of a driver associated with a device type of the expansion card to forbear any grant of permissions to the expansion card slot to conduct Direct Memory Access (DMA) with the host machine.

10. The one or more non-transitory computer-readable storage mediums of claim 1, wherein execution of the one or more sequences of instructions further cause:
upon the platform firmware determining that a particular expansion card inserted into a particular expansion card slot is presenting as an integrated device, the platform firmware denying any permission to the particular expansion card slot to allow DMA and preventing the expansion card from communicating with the host machine using DMA.

11. The one or more non-transitory computer-readable storage mediums of claim 1, wherein the platform firmware is Unified Extensible Firmware Interface (UEFI) platform firmware.

12. An apparatus comprising platform firmware, comprising:
one or more processors; and
one or more non-transitory computer-readable storage mediums storing one or more sequences of instructions, which when executed, cause:
the platform firmware securing the host machine against security attacks conducted using Direct Memory Access (DMA) by:
the platform firmware forbearing enablement of bus mastering during Peripheral Component Interconnect (PCI) bus enumeration,
upon the platform firmware determining that an expansion card has been plugged into an expansion card slot of the host machine, the platform firmware determining whether the expansion card slot has been approved by a user of the host machine for permitting Direct Memory Access (DMA) with the host machine, and
unless the expansion card slot has been determined to be approved by the user for permitting Direct Memory Access (DMA) with the host machine, forbearing a grant of permissions to the expansion card slot to conduct Direct Memory Access (DMA) with said host machine.

13. The apparatus of claim 12, wherein execution of the one or more sequences of instructions further cause:
the Unified Extensible Firmware Interface (UEFI) platform firmware providing controls, to the user of said host machine, to enable bus mastering for one or more expansion card slots of said host machine.

14. The apparatus of claim 13, wherein execution of the one or more sequences of instructions further cause:
upon the platform firmware receiving, from the user of said host machine via said controls, input authorizing bus mastering for a specific expansion card slot, storing authorizing data, evidencing that the specific expansion card slot has been approved by the user for conducting Direct Memory Access (DMA) with the host machine, in a persistent variable or in non-volatile storage.

15. The apparatus of claim 13, wherein execution of the one or more sequences of instructions further cause:
the platform firmware preventing the user from enabling at least one specific expansion card slot of said host machine using said controls.

16. The apparatus of claim 12, wherein the platform firmware determining that the device has been plugged into an expansion card slot of the host machine further comprises:
upon determining that the device is masquerading as an integrated device which has implicit approval for conducting Direct Memory Access (DMA) with the host machine, the platform firmware forbearing a grant of permissions to the rogue device to conduct Direct Memory Access (DMA) with said host machine.

17. The apparatus of claim 12, wherein the platform firmware forbearing enablement of bus mastering comprises:
the platform firmware comprising a PCI enumeration driver configured to indicate that DMA is supported for all devices and all bridges of the host machine without the platform firmware testing for such support.

18. The apparatus of claim 12, wherein the platform firmware determining whether the device has been approved by the user for conducting Direct Memory Access (DMA) with the host machine comprises:
the platform firmware, in a Connect process which connects a driver that supports a device type to a particular software device instance, accessing a persistent variable or non-volatile storage to determine whether the device has been approved by the user for conducting Direct Memory Access (DMA) with the host machine.

19. The apparatus of claim 12, wherein the platform firmware forbearing enablement of bus mastering comprises:
the platform firmware forbearing enablement of bus mastering on an upstream bridge of said expansion card slot of the host machine.

20. The apparatus of claim 12, wherein forbearing the grant of permissions to the expansion card slot to conduct Direct Memory Access (DMA) with the host machine comprises:
unless the platform firmware determines that the expansion card slot has been approved by the user for conducting Direct Memory Access (DMA) with the host machine, the platform firmware forbears calling an interface of a driver associated with a device type of the expansion card to forbear any grant of permissions to the expansion card slot to conduct Direct Memory Access (DMA) with the host machine.

21. The apparatus of claim 12, wherein execution of the one or more sequences of instructions further cause:
upon the platform firmware determining that a particular expansion card inserted into a particular expansion card slot is presenting as an integrated device, the platform firmware denying any permission to the particular expansion card slot to allow DMA and preventing the expansion card from communicating with the host machine using DMA.

22. The apparatus of claim 12, wherein the platform firmware is Unified Extensible Firmware Interface (UEFI) platform firmware.

23. A method for securing a host machine comprising platform firmware, comprising:
the platform firmware securing the host machine against security attacks conducted using Direct Memory Access (DMA) by:
the platform firmware forbearing enablement of bus mastering during Peripheral Component Interconnect (PCI) bus enumeration,
upon the platform firmware determining that an expansion card has been plugged into an expansion card slot of the host machine, the platform firmware determining whether the expansion card slot has been approved by a user of the host machine for permitting Direct Memory Access (DMA) with the host machine, and
unless the expansion card slot has been determined to be approved by the user for permitting Direct Memory Access (DMA) with the host machine, forbearing a grant of permissions to the expansion card slot to conduct Direct Memory Access (DMA) with said host machine.

* * * * *